United States Patent [19]

Kolegraff et al.

[11] 4,412,212

[45] Oct. 25, 1983

[54] SHEARBAR CLEARANCE DETECTOR

[75] Inventors: Kenneth J. Kolegraff; David T. Allen, both of Waterloo, Iowa

[73] Assignee: Deere & Company, Moline, Ill.

[21] Appl. No.: 291,589

[22] Filed: Aug. 10, 1981

[51] Int. Cl.³ .............................................. G08B 21/00
[52] U.S. Cl. .................................... 340/684; 340/519; 340/686
[58] Field of Search .............. 340/684, 679, 680, 671, 340/519, 686

[56] References Cited

U.S. PATENT DOCUMENTS

| 3,524,130 | 8/1970 | Asmanse. | |
|---|---|---|---|
| 3,628,136 | 12/1971 | Jonas. | |
| 3,641,431 | 2/1972 | Pigage et al. | |
| 3,646,542 | 2/1972 | Anthony. | |
| 3,747,010 | 7/1973 | Buck. | |
| 3,769,666 | 11/1973 | Kaufman. | |
| 3,851,323 | 11/1974 | Eltgen | 340/679 |
| 4,063,167 | 12/1977 | Duly. | |
| 4,090,194 | 5/1978 | Kosuge | 340/517 |
| 4,120,196 | 10/1978 | Hamilton et al. | |
| 4,198,006 | 4/1980 | Rolfe | 340/679 X |
| 4,205,797 | 6/1980 | Bennett et al. | 340/679 X |
| 4,217,542 | 8/1980 | Abbe et al. | |
| 4,223,302 | 9/1980 | Hocking | 340/517 X |
| 4,259,637 | 3/1981 | Bloomfield et al. | |
| 4,262,288 | 4/1981 | Lanphier et al. | 340/684 X |

Primary Examiner—David L. Trafton

[57] ABSTRACT

A forage harvester includes four multiple-bladed rotary cutting segments positioned near a shearbar. Four proximity sensors are mounted in shearbar bores near each of the cutting segments, each including a permanent magnet and a sensing coil. Blade motion near the sensors produces an electrical signal in the sensing coils. The signals from each sensing coil are integrated, sampled and averaged. The largest average signal is conditioned and applied to an analog meter for display to a vehicle operator. Switch and logic circuits permit the operator to monitor only selected one or ones of the cutting segments.

10 Claims, 8 Drawing Figures

SHEARBAR CLEARANCE DETECTOR

BACKGROUND OF THE INVENTION

This invention relates to a monitor for monitoring the clearance between the blades and shearbar of a cutting tool, and in particular, to a clearance monitor for a forage harvester cutting machine.

With current production forage harvester machines, the blade-shearbar clearance and blade sharpness critically influence the overall quality and efficiency of the forage cutting operation. For example, oversharpening results in excessive repair costs while undersharpening results in wasted fuel due to high power requirements, poorly cut forage and excessve strain on power train and cutterhead components. At present, operators must rely upon their senses (such as hearing) guided by experience in order to make judgements about the status of the blade-shearbar clearance to determine when blade sharpening and shearbar repositioning is required. It is difficult to achieve optimum operation of the forage harvester while relying on fallible human senses. An alternative is to periodically sharpen the blades and reposition the shearbar according to a set schedule. This alternative may result in corrective action being taken either before or after such action is strictly necessary, with resulting inefficiencies. Furthermore, when adjusting the shearbar blade clearance after blade sharpening, operators have been required to advance the shearbar toward the reverse rotating blades until a "clicking" sound is perceived, then to back the shearbar back away from the blades by a prescribed amount. Such an adjustment also is only as effective as the operator's judgment, experience and sense of hearing. Accordingly, it would be desirable to provide a means for monitoring blade-shearbar clearance which does not rely upon human senses, judgment and experience.

Variable capacitance sensing techniques have been used to measure the clearance in cutting tools. However, such sensors require that a relative potential be applied between the relatively movable cutting parts which necessitates electrically isolating those parts from each other. Furthermore, such capacitive sensors could yield misleading readings due to changes in the dialectric constant of the material being cut, such as would be caused by changes in the type of or moisture content of the forage materials. Eddy current sensing devices have also been used to measure the distance between a stationary sensor and a moving metal target object. However, such devices are expensive because they require the projection of a low level inductive field in front of the device and the sensing of eddy currents induced in the target object. Therefore, it would also be desirable to provide a clearance detector which utilizes an inexpensive distance measuring device which is relatively insensitive to dialectric variations in the material to be cut.

SUMMARY OF THE INVENTION

An advantage of the present invention is that it provides an electronic blade-shearbar clearance monitor which is substantially independent of human judgments, experience or senses.

A further advantage of the present invention is that it utilizes an inexpensive magnetic proximity sensor which is not influenced by dialectric changes in the material being cut.

Another advantage of the present invention is that it provides a clearance monitor which detects a minimum blade-shearbar clearance, independent of blade velocity.

Another advantage of the present invention is that it provides a clearance monitor adapted for use with a cutting machine with a plurality of cutting segments, each with a plurality of blades.

Another advantage of the present invention is that it permits the operator to select the cutting segment or segments which he desires to monitor.

Another advantage of the present invention is that it provides for detection of missing or broken blades.

A further advantage of the present invention is that it provides an indication of the functional condition of the proximity sensors and of portions of the signal conditioning circuitry.

A further advantage of the present invention is that it provides means for compensating for differences between various proximity sensors and between different display devices.

These and other advantages are achieved by a shearbar clearance monitor which includes a plurality of distance sensors mounted in a shearbar, each adjacent to a corresponding segment of a multiple-bladed rotary cutting tool. Each distance sensor includes a permanent magnet and a sensing coil in which a signal is produced in response to blade motion near the magnet. Integrating circuits receive the sensing coil signals and provide gap signals which are independent of blade velocity and which represent a minimun blade-shearbar clearance. Sample-and-hold circuits sample the gap signals as each blade moves by its sensor and generate average signals representing an average over time of a plurality of the sampled signals. A diode circuit selects the largest of the average signals. This selected signal is conditioned and applied to an analog meter via a meter driver circuit. A switch module and logic circuit allows the operator to monitor only those signals corresponding to selected one or ones of the cutting segments. Other circuit modules provide for detection of missing or broken blades, and for detection of the operating condition of the sensors and of portions of the monitoring circuits.

DETAILED DESCRIPTION

Figure 1:
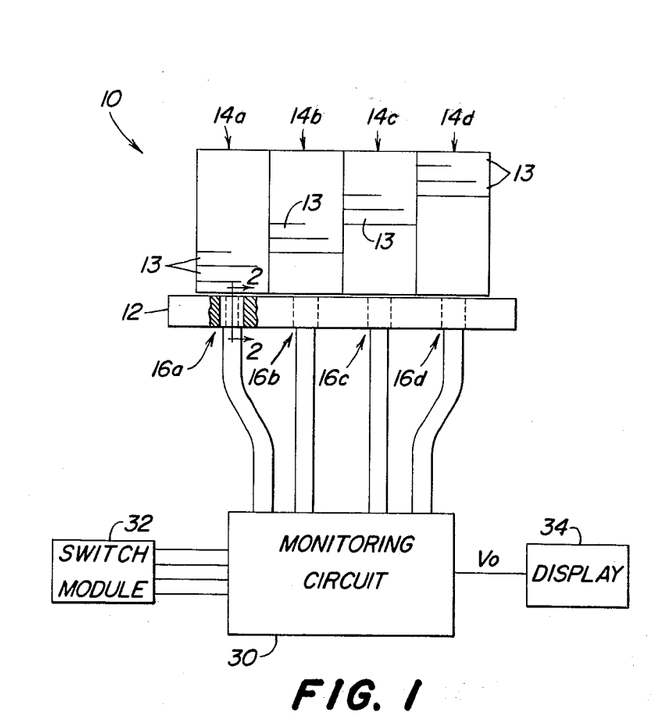
FIG. 1 is a schematic view of the applicants' monitor coupled with a top view of the associated cutting segments, shearbar and proximity sensors.
Figure 2:
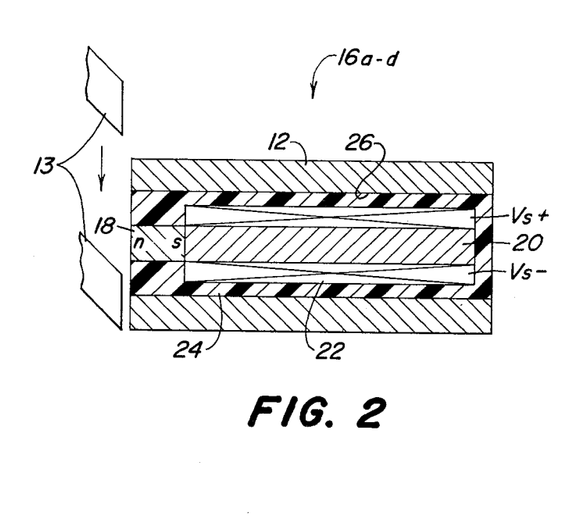
FIG. 2 is a cross-sectional view taken along lines 2—2 of FIG. 1 in elevation.

Current production forage harvesters, such as Deere Model Nos. 3940 and 3960, include a rotary cutting head unit 10 which includes a shearbar 12 and four rotary cutting segments 14a, b, c and d, each with a plurality of knives or blades 13. Other conventional forage harvesters have non-segmented cutting heads in which the knives extend across the entire width of the cutting head. According to the applicants' invention, a plurality of gap sensors 16a, b, c and d, are mounted in bores which extend through the shearbar 12. Each gap sensor corresponds to a segment or portion of the cutting head. As best seen in FIG. 2, each gap sensor 16 includes a permanent magnet 18 positioned at an end of a ferromagnetic or magnetic conductive rod 20. A sensing coil 22 coaxially surrounds the rod 20. The magnet 18 and rod 20 are mounted in a hollow cylindrical plastic casing 24 which is fixed within a bore 26 in the shearbar 12. Preferably, the outer end of the magnet 18 is flush with the end face of the shearbar 12 nearest the blades 13. The motion of each blade 13 past the gap sensor 16 produces an electrical signal or sensor voltage Vs across the terminals of the coil 22.

Referring again to FIG. 1, the output terminals of the four gap sensors are connected to a monitor circuit 30. Depending upon the condition of an operator-actuated switch module 32 mounted in an operator accessible position, such as in a vehicle cab, (not shown), or near the cutting unit 10, the circuit 30 generates output signals which contain information concerning the blade-shearbar spacing of selected one or ones of the cutting segments 14a, b, c and d. This information is displayed to the operator by a display panel 34 which includes an analog meter or a digital display and lamps or other type indicating devices.

Figure 3:
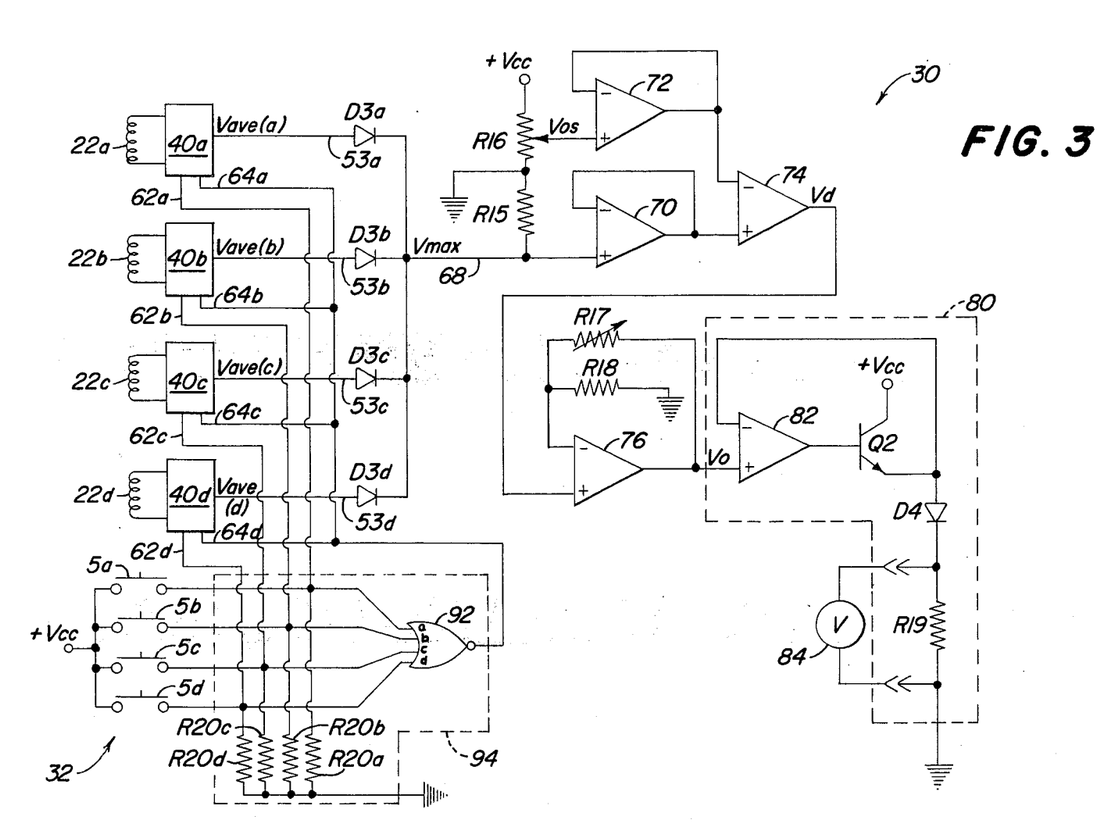
FIG. 3 is a circuit diagram of applicants' monitoring circuit.
Figure 4:
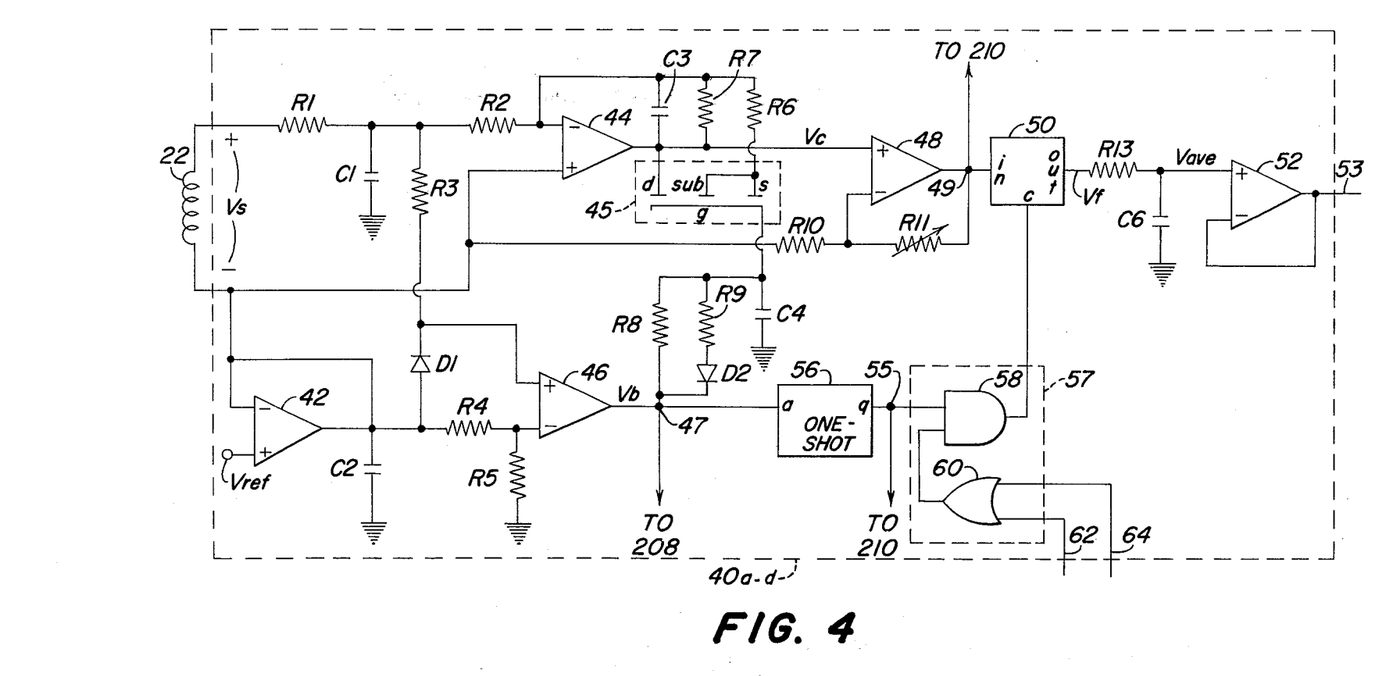
FIG. 4 is a detailed circuit diagram of identical circuits 40a–d of FIG. 3.

Circuit 30, as shown in FIG. 3, includes four identical signal conditioning circuits 40a, b, c and d, coupled to the coil terminals of a corresponding one of the gap sensors 16a, b, c and d. Referring now to FIG. 4, each circuit 40 includes a resistor R1 coupled to one sensing coil terminal and coupled to common terminals of resistors R2 and R3 and to ground via filter capacitor C1. The other terminal of sensing coil 22 is coupled to the output and the (−) input of a buffer amplifier 42 and to the (+) input of operational amplifier 44. The (+) input of amplifier 42 is connected to a voltage reference, Vref, for example, 1.2 volts D.C. The output of amp 42 is grounded via capacitor C2, and is coupled to the anode of diode D1 and to the (−) input of comparator 46 via resistor R4. The cathode of diode D1 is coupled to the other terminal of resistor R3 and to the (+) input of comparator 46. The (−) input of comparator 46 is coupled to ground via resistor R5. The other terminal of R2 is coupled to the (−) input of amplifier 44. The (−) input of amp 44 is also coupled to the source (S) and substrate (SUB) terminals of a field effect transistor (FET) 45 (such as a 2N4351) via resistor R6. The (−) input and output of amplifier 44 are coupled together by a parallel connected resistor R7 and an integrating or charging capacitor C3. The output of amp 44 is also coupled to the drain terminal (D) of FET 45 and to the (+) input of variable gain amplifier 48.

The gate (G) of FET 45 is grounded via capacitor C4 and is coupled via resistor R8 to terminal 47 which is coupled to the output of comparator 46. The gate G of FET 45 is coupled to the anode of diode D2 via resistor R9. The cathode of diode D2 is coupled to terminal 47.

A resistor R10 is coupled between the voltage reference at the output of buffer amp 42 and the (−) input of variable gain amplifier 48, which includes a variable resistor R11 coupled between terminal 49 and its (−) input. By varying R11, the gain of amplifier 48 may be varied to accommodate variations in the signal strengths from gap sensors 16a, b, c and d due to variations in the gap sensors themselves and due to variations in their mounting.

The output of amp 48 is coupled to terminal 49 and to the In terminal of CMOS switch 50. The OUT terminal of CMOS switch 50 is coupled to the (+) input of unity gain buffer amplifier 52 via resistor R13. The (+) input of buffer amp 52 is grounded via averaging capacitor C6. The (−) input of buffer amp 52 is tied to its output. The high impedance of buffer amp 52 prevents averaging capacitor C6 from discharging through the output line 53 of circuit 40.

Terminal 47 is coupled to the A input of monostable multivibrator or "one-shot" 56, such as a CD4528. One-shot 56 generates a relatively short, for example, slightly less than a 1 millisecond duration positive pulse of "data ready" pulse at its Q output, triggered by low-to-high transitions of comparator 46.

The Q output of one-shot 56 is connected to terminal 55 and to the input of AND gate 58 of logic circuit 57. The other input of AND gate 58 is coupled to the output of OR gate 60. Switch control lines 62 and 64 are connected to the inputs of OR gate 60. The output of AND gate 58 is connected to the control input C of CMOS switch 50. CMOS switch 50 is open when the output of AND gate 58 is low and closed when the output of AND gate 58 is high.

Referring again to FIG. 3, the output lines 53a–d of circuits 40a–d are each coupled to the anode of a corresponding diode D3a, b, c or d. The cathodes of diodes D3a–d are tied together and to the (+) input of unit gain buffer amplifier 70 via line 68. The (+) input of amplifier 70 is grounded via resister R15. A variable offset voltage Vos is derived from a potentiometer R16 connected between a voltage supply, +Vcc, (for example +8 volts D.C.) and ground. This offset voltage is applied to the (+) input of unity gain buffer amplifier 72. The output of both buffer amps 70 and 72 are coupled to their respective (−) inputs.

Thus, the buffered voltages Vmax and Vos are applied to (+) and (−) inputs, respectively, or a unity gain differential amplifier 74. The output Vd of differential amplifier 74 is coupled to the (+) input of a variable gain amplifier 76, whose gain may be adjusted, for example, between 1 and 6, by varying the variable resistor R17 connected between the (−) input and the output of variable gain amplifier 76. The (−) input of amplifier 76 is grounded via resistor R18.

The output Vo of variable gain amplifier 76 is coupled to a meter driver circuit 80 which includes an operational amplifier 82 with its (+) input coupled to the output of amplifier 76. The output of op amp 82 is coupled to the base of 2N2222 transistor Q2. The collector of transistor Q2 is coupled to +Vcc. The emitter of Q is coupled to the (−) input of op amp 82 and to the anode of diode D4. The cathode of diode D4 is coupled to ground via resistor R19. A conventional analog-type voltmeter 84 is coupled in parallel with resistor R19. It would be possible to substitute a digital display device (not shown) for the meter 84 if the output signal Vo were digitized by a suitable analog-to-digital converter (not shown).

The switch module 32, preferably mounted in an operator's compartment, includes four switches Sa, b, c and d. One side of each switch Sa–d is connected to +Vcc. The other side of each switch Sa–d is coupled to a respective input of NOR gate 92 of a logic circuit 94. The inputs of NOR gate 92 are coupled to ground via identical resistors R20a, b, c and d. The inputs of NOR gate 92 are also coupled to control lines 62a, b, c and d, respectively, of logic circuits 57 of circuits 40a-d, respectively. The output of NOR gate 92 is coupled to control lines 64a-d of logic circuit 57 of circuits 40a-d.

Figure 6:
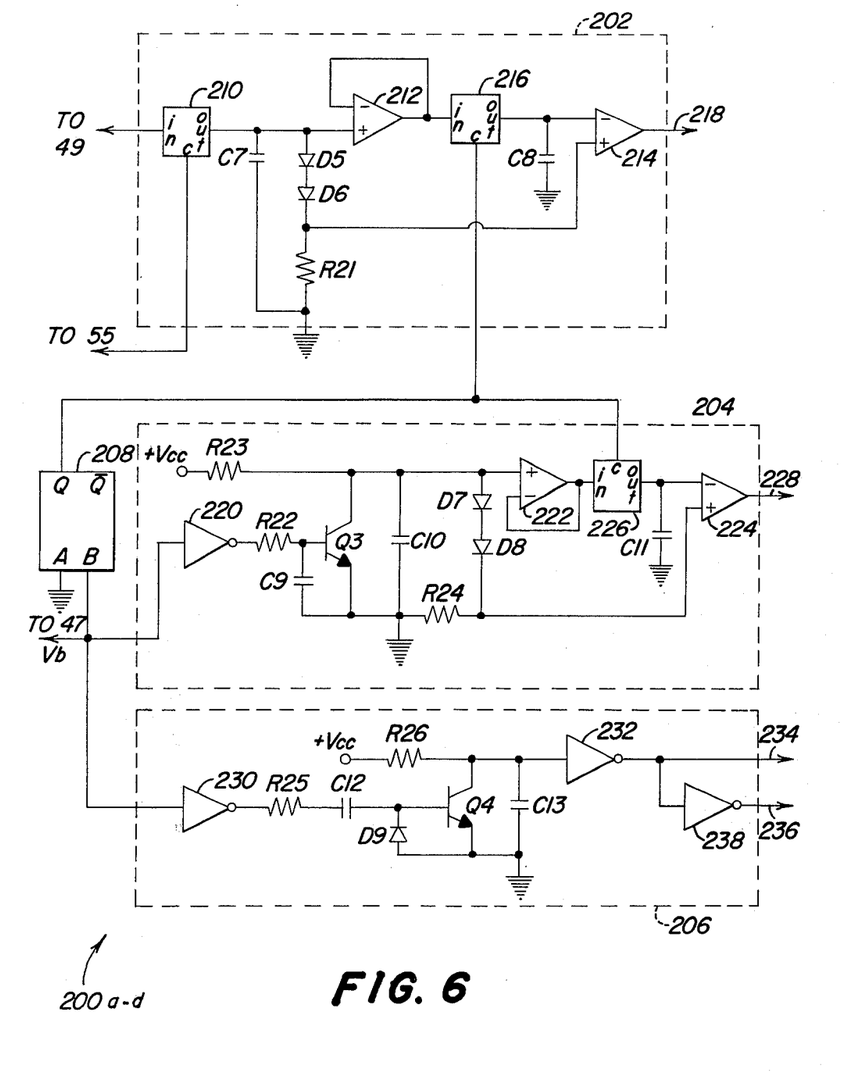
FIGS. 6, 7, and 8 are circuit diagrams of circuits which may be connected to the circuits shown in FIG. 4.

If desired, each of the four circuits 40a-d may each be coupled to a corresponding one of four identical circuits 200a-d, an example of which is shown in FIG. 6. Each of circuits 200a-d includes a worn or set-back blade detector unit 202, a missing or broken blade detector unit 204 and a unit 206 which detects whether the corresponding one of the sensors 16a-d are inoperative.

Each of circuits 200a-d includes a one-shot 208 with a grounded A input and a B input coupled to terminal 47 of circuit 40 to receive the voltage Vb. One-shot 208 generates at its Q output a positive pulse, a duration equal to that of one-shot 56 of circuit 40, in response to high-to-low transitions of Vb.

Each unit 202 includes a CMOS switch 210 with an IN terminal connected to terminal 49 of circuit 40 to receive the amplified integrating capacitor voltage Vc. The control input C of switch 210 is connected to terminal 55 of circuit 40. The OUT terminal of switch 210 is coupled to ground through sampling capacitor C7. The OUT of switch 210 is also coupled to the input of a unity gain buffer amplifier 212 and to the anode of the first (D5) of a pair of series connected diodes D5 and D6. The cathode of diode D6 is grounded via resistor R21 and is coupled to the (+) input of comparator 214. The output of buffer amp 212 is coupled to the IN terminal of CMOS switch 216, whose control C input is coupled to the Q output of one-shot 208. The OUT terminal of switch 216 is grounded via sampling capacitor C8 and is coupled to the (−) input of comparator 214. Buffer 212 provides isolation between sampling capacitors C7 and C8 to prevent the voltage on C8 from influencing the voltage on C7.

Each unit 204 includes an inverter 220 with an input coupled to terminal 47 of circuit 40 to receive voltage Vb. The output of inverter 220 is coupled to the base of transistor Q3 via resistor R22. The base of Q3 is grounded through capacitor C9. The emitter of Q3 is grounded and its collector is coupled to +Vcc via resistor R23, to the (+) input of unity gain buffer amp 222, and to ground via capacitor C10. The collector of transistor Q3 is also coupled to the anode of a series connected pair of diodes D7 and D8. The cathode of diode D8 is grounded via resistor R24 and is connected to the (+) input of comparator 224. The output of buffer amp 222 is connected to its (−) input and to the IN terminal of another CMOS switch 226. The control terminal C of switch 226 is coupled to the Q output of one-shot 208. The OUT terminal of switch 226 is grounded via sampling capacitor C11 and is coupled to the (−) input of comparator 224. The output of comparator 224 is connected to output line 228.

Each unit 206 includes an inverter 230 coupled to receive voltage Vb from terminal 47 of the corresponding one of circuits 40a-d. The output of inverter 230 is coupled to one side of a capacitor C12 via resistor R25. The other side of capacitor C12 is connected to the base of transistor Q4 and to the cathode of diode D9. The anode of diode D9 and the emitter of Q4 are grounded. The collector of Q3 is coupled to +Vcc via resistor R26, to ground via capacitor C13 and to the input of an inverting Schmitt trigger 232. The output of Schmitt trigger 232 is connected to an output line 234 and to an output line 236 via invertor 238.

Figure 7:
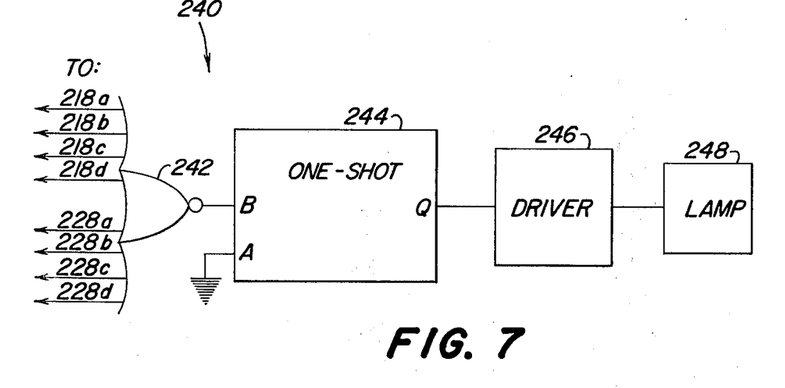
Figure 8:
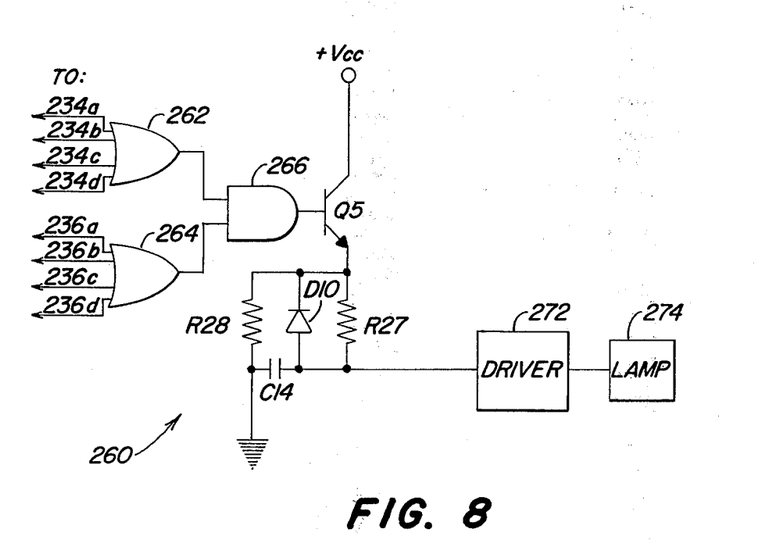

The output lines 218, 228, 234 and 236 of circuits 200a-d are coupled to corresponding inputs of circuits 240 and 260, shown in FIGS. 7 and 8, respectively.

Circuit 240, shown in FIG. 7, includes a multiple input NOR gate 242. Four of the NOR gate inputs are coupled to corresponding ones of the output lines 218a-d of units 202a-d of circuits 200a-d. Another four of the NOR gate inputs are coupled to corresponding ones of the output lines 228a-d of units 204a-d of circuits 200a-d. The output of NOR gate 242 is coupled to the B input of a one-shot 244 (which may be the same as one-shot 56) with a grounded A input. One-shot 244 generates a positive pulse of predetermined duration at its Q output in response to high-to-low transitions applied to its B input. The Q output is connected to a lamp driver circuit 246, such as a cascaded double transistor current amplifier which, in turn, drives lamp or other type indicator device 248 in display panel 34 when the Q output of one-shot 244 is high.

Circuit 260, shown in FIG. 8, includes an OR gate 262 with each input coupled to a corresponding one of output lines 234a-d of units 206 of circuits 200a-d. Circuit 260 also includes another OR gate 264 with each input coupled to a corresponding one of output lines 236a-d of units 206 of circuits 200a-d. The outputs of OR gates 262 and 264 are coupled to the inputs of AND gate 266, whose output is coupled to the base of transistor Q5. The collector of Q5 is coupled to +Vcc. The emitter of Q5 is coupled to the input of a lamp driver 272, similar to lamp driver 246, via resistor R27, to the cathode of diode D10 and to ground via resistor R28. The input of lamp driver 272 is coupled to the anode of diode D10 and to ground via capacitor C14. A Schmmitt trigger (not shown) may be coupled between R27 and the lamp driver 272 so that its hysteresis can prevent unstable operation of the lamp driver 272 when the voltage on capacitor C14 is near the threshold level of the lamp driver 272. Driver 272 drives a lamp or other type indicator device 274 also located on the display panel 34.

It should be noted that a display panel (34 in FIG. 1) containing the lamps and the meter 84 and lamps 248 and 274 may be mounted so that they are visible to the operator while in the operator's compartment (not shown) so that the blade-shearbar clearance can be monitored during operation of the forage harvester. It would also be desirable to have a display 32 positioned so that it is visible from the position which the operator assumes when he is adjusting the shearbar clearance, such as after blade sharpening. This could be accomplished with a movable display or with a separate display (not shown) positioned so as to be visible from the adjusting position. In this manner, the operator could utilize the meter reading as an aid to properly position the shearbar after blade sharpening.

Mode of Operation

Figure 5:
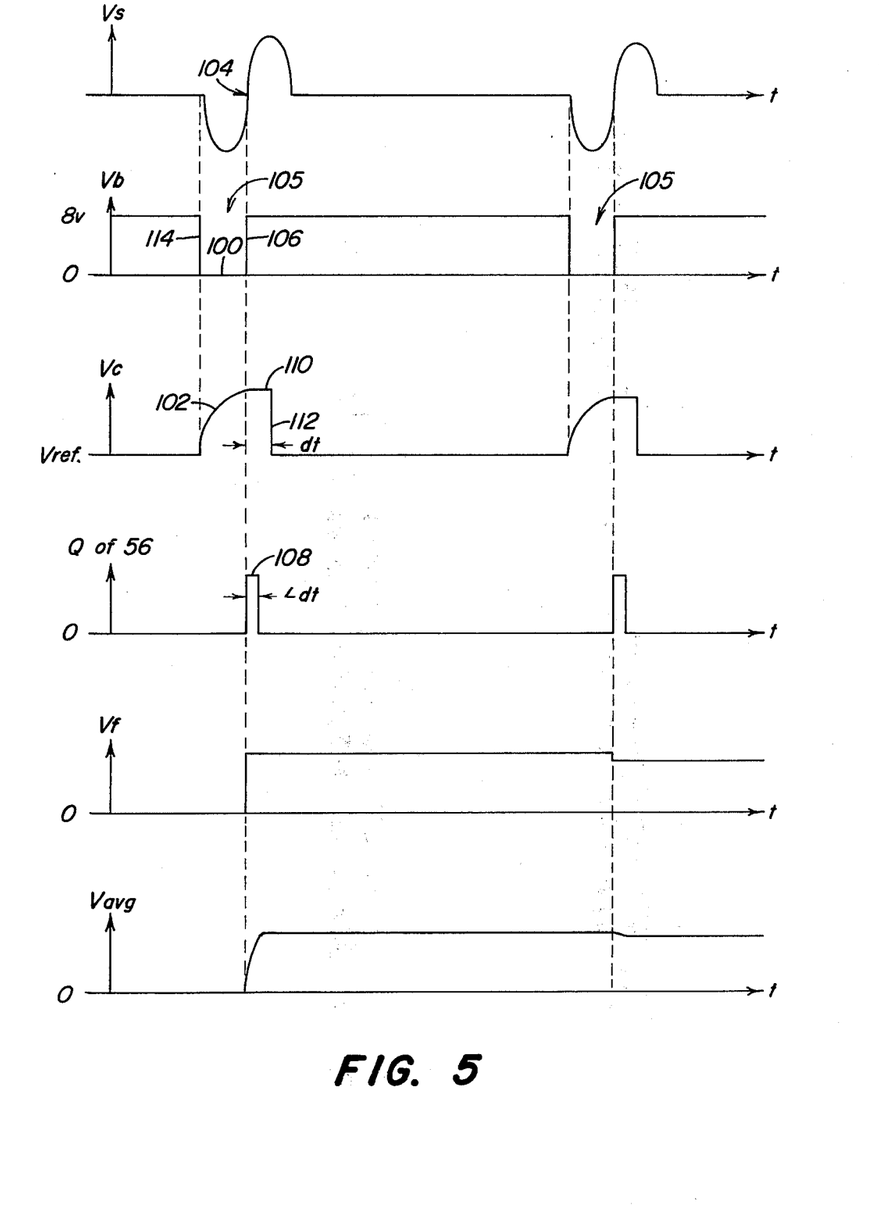
FIG. 5 is a waveform diagram of signals at various positions in applicants' circuit.

The motion of a blade 13 of one of the cutting segments 14a-d in the vicinity of the corresponding one of the gap or proximity sensors 16a-d, disturbs the magnetic field generated by the permanent magnet 18. The changing magnetic field produces a sensor voltage Vs across the sensing coil 22, as seen in FIG. 5. The polarity of this voltage Vs, when the blade 13 is moving away from the sensor 16, is reversed from its polarity when the blade 13 is moving toward the sensor 16. The voltage Vs reverses polarity and its magnitude is neutral with respect to the reference voltage Vref at the instant when the spacing between the blade 13 and the sensor 16, in a direction along the axis of the coil 22, is a minimum.

The normally high voltage Vb at the output of comparator 46 and a terminal 47 is low, as at 100, as long as Vs is less than the reference voltage Vref. The low level of Vb turns the FET 45 off, thus allowing amplifier 44 to charge up the integrating capacitor C3, as at 102.

It is desirable to integrate the sensor voltage Vs for the following reasons. The peak value of the voltage Vs produced by the sensor 16 is a function of the air gap to be measured, the velocity of the moving blade 13 and other constant factors such as the field strength of the magnet 18, the number of coil turns of coil 22, various impedances and geometries. For example, at low blade velocity, the voltage Vs will have a relatively lower amplitude but a relatively longer duration. Conversely, at higher blade velocities, the voltage Vs will have a higher amplitude, but a shorter duration. However, a time integration of the voltage Vs produces a signal which is independent of the blade velocity because the area under the time-voltage curve Vs in FIG. 5 is substantially only a function of the minimum separation or gap between the blade 13 and the sensor 16. Thus, the voltage Vc across capacitor C3 is an ingegral function of the sensor voltage Vs and is therefore indicative of the minimum blade-sensor separation.

When the sensor voltage Vs passes through the level of Vref, as at 104, the output Vb switches low-to-high, as at 10. This low-to-high transition of Vb triggers one-shot 56 to produce a positive polarity "data ready" pulse of duration slightly less than 1 millisecond, as at 108, which, through AND gate 58, closes normally opened CMOS switch 50 for a corresponding period. With switch 50 closed, the volage Vf will be proportional to the peak value of voltage Vc. Voltage Vf is communicated to averaging capacitor C6 via resistor R13, causing capacitor C6 to the charge or discharge as its voltage Vave exponentially approaches a voltage which is proportional to voltage Vc. Thus, as many blades rotate past the sensor 16, the voltage vave will be substantially proportional to the average value of the peak value of volage Vc, as at 110.

The low-to-high transition of Vb at 106 causes a similar change in the voltage across capacitor C4, however, this change is delayed in time with respect to the transition at 106 because C4 can only be charged up through the relatively large impedance of resistor R8. This causes FET 45 to be turned on to discharge or null the voltage across integrating capacitor C3, as at 112, some delay time dt after the low-to-high transition of voltage Vb. Resistor R8 and capacitor C4 are chosen so that this delay time dt is greater than the duration of the 37 data ready" pulse 108 of one-shot 56. In this manner, CMOS switch 50 is opened after capacitor C6 is allowed to charge up so that the peak value of voltage Vc is adequately sampled, but before the discharging of integrating capacitor C3, so that voltage Vave across capacitor C6 is not influenced when capacitor C3 is discharged. Note that it is preferable for resistor R9 to have an impedance which is substantially lower than that of resistor R8 so that capacitor C4 may be rapidly discharged through resistor R8 and diode D4 to turn off FET 45 in response to the high-to-low transition of voltage Vb, as at 114.

Turning now to FIG. 3, each circuit 40a–d produces an average output voltage Vave(a)–(d) in the manner just described to represent the average minimum blade-sensor gap for the corresponding cutting segments 14a–d. The diode network comprised of diodes D3a–d produces a voltage Vmax at line 68 which is equal to the highest of the voltages Vave(a)–(d), less the small 0.7 volt diode voltage drop.

Unity gain differential amplifier 74 generates a difference voltage Vd equal to the difference between the buffered voltage Vmax and the buffered offset voltage Vos. This difference voltage Vd is amplified by variable gain amplifier 76 to obtain the output voltage Vo which is applied to the meter driver 80 which drives meter 84. Thus, the meter 84 generates a visible signal which is indicative of the average blade-sensor separation of the cutting segment 14 with the minimum average blade-sensor separation. By varying the offset voltage Vos and the gain of amplifier 76, the output of sensors 16 can be matched to display meters with different operating voltage ranges.

The previous description assumes that all push button switches Sa–d are open, so that the CMOS switches 50 in each of circuits40a–d may be periodicaly closed by the one-shots 56. In this manner, a non-zero average voltage Vave will be present at each of lines 53a–d. But, in this situation, the operator cannot determine which of the cutting segments 14a–d is represented by the signal displayed at the meter 84.

However, if the operator wants to monitor only cutting segment 14a, for example, he need only press push button 5a. This causes the voltage at input a of NOR gate 92 and on the control line 62a of circuit 40 to toggle high, while control lines 62b–d of circuits 40b–d remain low. This causes the normally high output of NOR gate 92 to switch low and causes control line 64a–d to switch low. Thus, both control lines 62 and 64 of circuits 40b–d are now low, while control line 62a of circuit 40a is high. Since both control lines 62 and 64 of circuits 40b–d are low, then the output of OR gate 60 is low and AND gate 58 will prevent the "data ready" pulse from one-shot 56 from closing CMOS switch 50, thus preventing communication of the amplified Vc voltage at the output of amplifier 48 to the averaging capacity C6 and voltages Vave(b)–(d) of circuits 40b–d will be essentially zero. However, since control line 62a of circuit 40a is high, the output of OR gate 60 of circuit 40a remains high, the one-shot pulses will be allowed to periodically close switch 50 via AND gate 58 and a non-zero voltage Vave(a) will appear at the output 53a of circuit 40a. Thus, Vmax on line 68 will represent only Vave)a) and the meter 84 will display a value corresponding only to cutting segment 14a. In a similar manner, any combination of circuits 40a–d may be abled or disabled by opening or closing a corresponding combination of switches Sa–d. Whichever of circuits 40a–d are enabled, the meter 84 displays a value corresponding to the average blade-sensor separation of the cutting segment with the minimum average blade-sensor separation of the cutting segments corresponding to the enabled ones of the circuits 40a–d.

Each unit 202 operates as follows: The voltage Vc produced by the motion of a first blade 13 is sampled and held by capacitor C7 triggered by the pulse of the Q output of one-shot 56 beginning at the low-to-high transition of voltage Vb. Then at the next high-to-low transition of Vb, caused by the motion of the second blade 13, the pulse output of one-shot 208 momentarily closes CMOS switch 216 so that the first sampled voltage on capacitor C7 is transferred to and held on capacitor C8. The voltage Vc corresponding to the second blade 13 is then sampled and held on C7 at the next low-to-high transition of Vb. Thus, the voltage Vc7 (less a double diode voltage drop of 1.4 volts) and the voltage Vc8, corresponding to the current blade and to the previous blade, respectively, are fed to the (+) and (−) inputs, respectively, of comparator 214. In this manner, the normally low output at 218 of comparator 214 goes high whenever the current voltage Vc7 is greater than the previous voltage Vc8 plus 1.4 volts. This condition would be met when the previous voltage on C8 is reduced with respect to the current voltage on C7, as would happen when an undamaged current blade follows a worn or set-back previous blade.

Each unit 204 operates as follows: During normal operation, the transitions or negative pulses 105 of voltage Vb at the output of comparator 46 of each of circuits 40a–d and the "data ready" pulses, as at 108 in FIG. 5, cause alternate charging and discharging of the integrating capacitor C3 as each blade 13 passes by one of the sensors 16a–d. These periodic negative pulses of voltage Vb are received by invertor 220 of unit 204 to periodically turn transistor Q3 on when Vb is low so that capacitor C10 is periodically discharged. However, C10 is periodically charged via resistor R23 during the period when Vb is high between the negative pulses of Vb when transistor Q3 is off. Prior to each discharge of C10, its voltage is sampled by capacitor C11 through the operation of CMOS switch 226 and one-shot 208 in a manner similar to sampling of the consecutive voltages by capacitors C7 and C8 of unit 202. After the voltage on C10 is transferred to C11 and C10 is discharged, then the low-to-high transition of Vb turns Q3 off and allows C10 to charge up again to a new voltage. Thus, the old voltage on C11 and the new voltage on C10 (less a two diode drop of 1.4 volts) are compared by comparator 224 whose normally low output at 228 switches high only when the new voltage on C10 (less 1.4 volts) is greater than the old voltage on C11. If no negative pulses of Vb are missing, then the periodic discharging of capacitor C10 prevents this new voltage from becoming high enough to switch th output of comparator 224 high. However, if a negative pulse of Vb is not generated by comparator 46 due to some malfunction, such as a completely missing or severely broken blade or an electrical failure, then Q3 will not be turned on, and C10 will continue charging up to a new voltage which will eventually become greater than the old voltage on C11 plus 1.4 volts, thus toggling the output of comparator 24 high in response to the malfunction condition.

Circuit 240 operates as follows: During normal operation, the inputs 218a–d and 228a–d to NOR gate 242 are all low, the output of NOR gate 242 is high, the Q output of one-shot 244 is low and the lamp or indicator 248 will be in an inactive condition. However, if any of blades 13 are worn, set-back, missing or broken, then a particular one of inputs 218a–d and 228a–d will go high due to the operation of units 202 and 204, as previously described. If any of the inputs to NOR gat 242 goes high, then the output of NOR gate 242 will change from high to low, thus triggering a pulse of chosen duration from the Q output of one-shot 244. This pulse will cause driver 246 to activate lamp or indicator 248 to generate a visible or operator-detectable signal, thus warning the operator of the worn, setback, missing or broken blade condition.

Each unit 206 and the associated circuit 260 operates as follows: When Vb is high, transistor Q4 turns off and capacitor C13 charges up slowly through relatively high impedance resistor R26. However, during normal operation, C13 will be periodically discharged by Q4 turning on in response to the negative pulses of voltage Vb, as at 105 of FIG. 5, thus preventing C13 from charging up high enough to trigger Schmitt trigger 232. Thus, during normal operation, all output lines 234a–d of circuits 200a–d are high and all output lines 236a–d of circuits 200a–d are low. With all of lines 234a–d high, the output of OR gate 262 is high and with all of lines 236a–d low, then the output of OR gate 264 is low. Thus, with OR gate 264 low, AND gate 266 is low, transistor Q5 is off and the lamp driver 272 and lamp 274 are deactivated.

If, however, at least one of sensors 16a–d is not operative while at the same time, at least one of the sensors 16a–d is operative, then there will be an absence of a negative Vb pulse associated with that inoperative sensor. Thus, the output lines 234 and 236 will toggle low and high, respectively, for the unit 206 associated with that inoperative sensor, because the capacitor C13 of that unit 206 will no longer be periodically discharged by the negative Vb pulse. For the remaining units 206 associated with operative sensors, their output lines 234 and 236 will remain in their normally high and low states, respectively. Thus, whenever there is a mixture of both operative and inoperative sensors 16a–d, there will be a mixture of low and high inputs to both of OR gates 262 and 264 of circuit 260. This causes the outputs of both OR gates 262 and 264 and the output of AND gate 266 to be high, thus turning on transistor Q5. If this condition persists for a long enough period of time, then eventually C14 will charge up to a high enough voltage to activate lamp driver 272 and lamp or indicator 274 to warn the operator of this condition. Because this condition may exist temporarily whenever the machine is started up initially, the time constant of R27 and C14 is made sufficiently long to prevent this temporary condition from activating the lamp 274.

Note, also, that if the machine is stopped so that none of the blades 13 are moving, then none of comparators 46 or circuits 40a–d will be generating any negative Vb pulses, as at 105 of FIG. 5. Thus, all of output lines 234 of units 206 will be low, and all of output lines 236 of units 206 will be high. Referring now to FIG. 8, this means all inputs to OR gate 262 are low and all inputs to OR gate 264 are high, causing a low and a high level signal, respectively, to be applied to AND gate 266. Therefore, during this "machine off" condition, the output of AND gate 266 remains low, so that Q5, the lamp driver 272 and the lamp 274 remain deactivated. Thus, units 206 and circuit 260 cooperate to generate a warning signal when some, but not all, of the sensors 16a–d are working, but prevent generation of a misleading warning signal when all the sensors 16a–d are inoperative due to lack of rotation of the cutterhead 10.

It will be apparent that the various functions of the above desribed clearance monitor could be implemented with a suitably programmed microprocessor and with conventional analog-to-digital converters for converting the analog Vave signals to digital signals. Therefore, the following claims should be construed accordingly.

We claim:
1. In a cutting machine having a shearbar and a plurality of blades movable with respect to the shearbar to cut material inserted therebetween, a clearance monitor for monitoring clearance between the blades and the shearbar, comprising:

a proximity sensor fixed with respect to the shearbar for sequentially generating a plurality of proximity signals, each proximity signal varying as a function of velocity and separation of the one of the plurality of blades with respect to the shearbar;

an integrator coupled to receive the plurality of proximity signals, the integrator converting each proximity signal to a gap signal having a magnitude representing a minimum separation between the sensor and the corresponding blade, the magnitude of the gap signal being substantially independent of blade velocity;

an averaging circuit coupled to sequentially receive the gap signals and generating an average gap signal representing an average over time of the minimum separations between the sensor and the plurality of blades;

means for generating an offset signal having a desired magnitude;

differential amplifier means for generating a difference signal representing a difference between the offset and the average gap signal;

variable amplifier means for generating an output signal obtained by multiplying the difference signal by a predetermined gain factor;

display means for generating an operator-detectable signal representing the output signal; and adjustable means for varying the magnitudes of the offset signal and the gain factor.

2. A clearance monitor for a cutting machine having a shearbar and a multi-bladed cutting head rotatable to cut material inserted between the blades and the shearbar, the clearance monitor comprising:

a proximity sensor fixed to the shearbar for generating a plurality of proximity signals each representing clearance between the shearbar and a corresponding one of the blades;

means for receiving and comparing consecutive proximity signals corresponding to consecutive passage of the blades past the proximity sensor and for generating a warning signal when the consecutive proximity signals differ by a predetermined amount.

3. In a cutting machine having a shearbar and a plurality of blades movable with respect to the shearbar to cut material inserted therebetween, a clearance monitor for monitoring clearance between the blades and the shearbar, comprising:

a proximity sensor fixed with respect to the shearbar for sequentially generating a plurality of proximity signals, each proximity signal having an amplitude which varies as a function of velocity and separation of the one of the plurality of blades with respect to the shearbar;

an integrator coupled to receive the plurality of proximity signals, the integrator converting each proximity signal to a gap signal with a magnitude representing a minimum separation between the sensor and corresponding one of the blades, the magnitude of the gap signal being substantially independent of blade velocity;

means coupled to the proximity sensor for generating a variable signal as each blade moves past the proximity sensor;

means for sampling each gap signal in response to each variable signal;

means for nulling the integrator in response to each variable signal after each gap signal is sampled;

means for generating an operator-detectable signal representing the sampled gap signals; and means for generating a warning signal in response to the absence of a variable signal.

4. In a forage harvester having a shearbar and a rotatable cutting head having a plurality of blades for cutting material inserted between the shearbar and the blades, a clearance monitor for monitoring blade-shearbar clearance comprising:

a plurality of proximity sensors, each fixed to the shearbar adjacent a corresponding portion of the cutting head, each proximity sensor generating proximity signals representing separation between the shearbar and the blades of the corresponding cutting head portion;

first circuit means for generating a first warning signal when any one or ones of the proximity signals deviates from normal levels, the first warning signal being indicative of the deviation, the first circuit means also including a plurality of comparator means, each coupled to a corresponding one of the proximity sensors for generating a pulse signal in response to passage of a blade past the corresponding proximity sensor, each comparator means generating no pulse signal when the corresponding proximity sensor is inoperative, when the passing blade is missing and when at least a portion of the passing blade is missing;

a display device for converting the first warning signal to an operator-detectable signal;

a warning device distinct from the display device; and second circuit means coupled to receive the pulse signals for activating the warning device when a pulse signal is generated by at least one of the comparator means while a pulse signal is not generated by at least one of the other comparator means and for deactivating the warning device when no pulse signals are generated by any of the comparator means.

5. In a forage harvester having a shearbar and a rotatable cutting head having a plurality of blades for cutting material inserted between the shearbar and the blades, a clearance monitor for monitoring blade-shearbar clearance comprising:

a plurality of proximity sensors, each fixed to the shearbar adjacent to a corresponding portion of the cutting head, each proximity sensor generating proximity signals representing separation between the shearbar and the blades of the corresponding cutting head portion;

output means coupled to receive the proximity signals for converting the proximity signals to an operator-detectible signal; and a plurality of variable gain means, each operatively coupled to one of the proximity sensors for compensating for variations among the proximity sensors.

6. In a cutting machine having a shearbar and a rotatable cutting head having a plurality of blades for cutting material inserted between the shearbar and the blades, a clearance monitor for monitoring blade-shearbar clearance comprising:

a plurality of proximity sensors, each proximity sensor being fixed to the shearbar adjacent a corresponding portion of the cutting head, each proximity sensor generating a plurality of proximity signals in response to motion of the blades, each proximity signal having a magnitude representing a minimum clearance between one of the blades and the shearbar;

a plurality of averaging circuits, each corresponding to one of the cutting head portions and each coupled to receive the plurality of proximity signals from a corresponding one of the proximity sensors, each averaging circuit generating an average signal representing an average of the plurality of the proximity signals received by it;

a selecting circuit coupled to receive the average signals from all of the averaging circuits, the selecting circuit selecting the average signal representing the cutting head portion having the smallest average blade-shearbar clearance of all the cutting portions; and operator-controlled switch means for controlling signal communication between the selecting circuit and chosen one or more of the proximity sensors wherein the operator-controlled switch means comprises a plurality of operator-actuated signal generators, each corresponding to one of the cutting head portions, a plurality of normally open switch means interposed between each proximity sensor and the corresponding averaging circuit, each normally open switch means being closeable in response to signals applied to an input thereof and logic gate means coupled between the operator-actuated signal generators and the inputs of the normally open switch means for applying signals to the inputs of selected ones of the switch means in response to actuation of selected ones of the operator-actuated signal generators; and display means coupled to the selecting circuit for displaying an operator-detectable signal representing the selected average signal.

7. In a cutting machine having a shearbar and a plurality of blades movable with respect to the shearbar to cut material inserted therebetween, a clearance monitor for monitoring clearance between the blades and the shearbar, comprising:

a proximity sensor fixed with respect to the shearbar for sequentially generating a plurality of proximity signals, each proximity signal having an amplitude which varies as a function of velocity and separation of one of the plurality of blades with respect to the shearbar;

an integrator coupled to receive the plurality of proximity signals, the integrator converting each proximity signal to a gap signal with a magnitude representing a minimum separation between the sensor and corresponding one of the blades, the magnitude of the gap signal being substantially independent of blade velocity;

an averaging circuit coupled to sequentially receive the gap signals and generating an average gap signal representing an average over time of the minimum separations between the sensor and the plurality of blades; and output means for converting the average gap signal to an operator-detectible signal, the output means comprising offset signal generating means for generating a variable magnitude offset signal, differential amplifier means for generating a difference signal representing a difference between the gap signal and the offset signal, and variable gain amplifier means for converting the difference signal to the operator-detectible signal obtained by multiplying the difference signal by a predetermined gain factor.

8. In a cutting machine having a shearbar and a rotatable cutting head having a plurality of blades for cutting material inserted between the shearbar and the blades, a clearance monitor for monitoring blade-shearbar clearance comprising:

a plurality of clearance detectors, each generating a clearance signal indicative of the clearance between a portion of the shearbar and a corresponding portion of the cutting head;

a selecting circuit coupled to receive the clearance signals and generating a selected signal representing a selected one of the signals received by it;

operator-controlled means coupled between the plurality of clearance detectors and the selecting circuit for preventing communication of designated ones of the plurality of clearance signals to the selecting circuit;

display means for displaying the selected one of the clearance signals communicated to the selecting circuit;

means for generating an offset signal having a desired magnitude;

differential amplifier means for generating a difference signal representing a difference between the offset and the selected signal;

variable amplifier means for generating an output signal obtained by multiplying the difference signal by a predetermined gain factor;

means for communicating the output signal to the display means; and adjustable means for varying the magnitudes of the offset signal and the gain factor.

9. The clearance monitor of claim 2, wherein the receiving, comparing and generating means comprises:

sample-and-hold means for holding signals representing the magnitude of successive proximity signals;

signal reduction means coupled to receive the proximity signals and for providing reduced magnitude proximity signals; and a comparator having a first input coupled to receive the signal held by the sample-and-hold means and having a second input coupled to receive the reduced magnitude proximity signals, the comparator generating the warning signal when consecutive proximity signals received by it differ by said predetermined amount.

10. The clearance monitor of claim 3, wherein the warning signal generator means comprises:

means for charging a charging capacitor;

means for periodically discharging the charging capacitor each time a variable signal is generated;

means for periodically sampling and holding a voltage across the charging capacitor before it is discharged; and a comparator having a first input coupled to receive a reduced voltage across the charging capacitor and having a second input coupled to receive the held voltage, the comparator generating the warning signal when the voltage at its first input is greater than the voltage at its second input.

* * * * *